(12) United States Patent
Rizzi et al.

(10) Patent No.: US 9,039,986 B2
(45) Date of Patent: May 26, 2015

(54) CHEMICAL REACTOR WITH A PLATE HEAT EXCHANGER

(75) Inventors: Enrico Rizzi, Casnate con Bernate (IT);
Ermanno Filippi, Castagnola (CH);
Mirco Tarozzo, Ligornetto (CH)

(73) Assignee: Casale SA (CH)

( * ) Notice: Subject to any disclaimer, the term of this patent is extended or adjusted under 35 U.S.C. 154(b) by 110 days.

(21) Appl. No.: 13/639,003

(22) PCT Filed: Mar. 14, 2011

(86) PCT No.: PCT/EP2011/053761
§ 371 (c)(1),
(2), (4) Date: Oct. 2, 2012

(87) PCT Pub. No.: WO2011/124442
PCT Pub. Date: Oct. 13, 2011

(65) Prior Publication Data
US 2013/0052097 A1 Feb. 28, 2013

(30) Foreign Application Priority Data

Apr. 8, 2010 (EP) .................... 10159414

(51) Int. Cl.
*B01J 19/00* (2006.01)
*B01J 19/24* (2006.01)
(Continued)

(52) U.S. Cl.
CPC .............. *B01J 19/249* (2013.01); *B01J 8/0214* (2013.01); *B01J 8/0285* (2013.01);
(Continued)

(58) Field of Classification Search
CPC ........ B01J 19/00; B01J 19/0013; B01J 19/24; B01J 19/249; B01J 7/00; B01J 8/00; B01J 8/02; B01J 8/0285; B01J 8/067; B01J 2219/00081; B01J 2219/00085; B01J 2208/00132; B01J 2208/00212; F28D 7/024; B23P 15/26; B21D 53/04
USPC .......... 422/129, 198, 200, 201; 165/157–160, 165/177
See application file for complete search history.

(56) References Cited

U.S. PATENT DOCUMENTS 6,460,614 B1 * 10/2002 Hamert et al. ................ 165/170

FOREIGN PATENT DOCUMENTS

| EP | 1 279 915 A1 | 1/2003 |
|---|---|---|
| EP | 1 284 813 B1 | 8/2007 |
| WO | WO 2009/068158 A1 * | 6/2009 |

OTHER PUBLICATIONS

International Search Report issued in connection with PCT/EP2011/053761.

(Continued)

*Primary Examiner* — Natasha Young
(74) *Attorney, Agent, or Firm* — Akerman LLP

(57) ABSTRACT

A steam cooled chemical reactor (1) comprising a vertical vessel (2), a plate heat exchanger embedded in a catalytic bed, to cool the catalytic bed by evaporation of a cooling water flow, wherein a water inlet and a steam outlet are located underneath the heat exchanger, and the plates and related piping are arranged so that the path of the cooling flow comprises a first ascending path from bottom to top of the catalytic bed, and a second descending path from top to the bottom of catalytic bed, and wherein internal evaporation channels of the plates provide the second descending or the first ascending path, and water upcomers or respectively steam downcomers provide the other of said first and second path.

11 Claims, 3 Drawing Sheets

(51) Int. Cl.
    *B01J 8/00*  (2006.01)
    *B01J 8/02*  (2006.01)
    *B01J 8/06*  (2006.01)
    *F28D 9/00*  (2006.01)

(52) U.S. Cl.
    CPC .... *B01J 2208/0015* (2013.01); *B01J 2208/022* (2013.01); *B01J 2219/185* (2013.01); *B01J 2219/1943* (2013.01); *B01J 2219/2455* (2013.01); *B01J 2219/2458* (2013.01); *B01J 2219/2459* (2013.01); *B01J 2219/2462* (2013.01); *B01J 2219/2481* (2013.01); *B01J 2219/2485* (2013.01); *F28D 9/0006* (2013.01); *F28D 9/0031* (2013.01); *F28D 9/0062* (2013.01)

(56) References Cited

OTHER PUBLICATIONS

International Preliminary Report on Patentability issued in connection with PCT/EP2011/053761.

\* cited by examiner

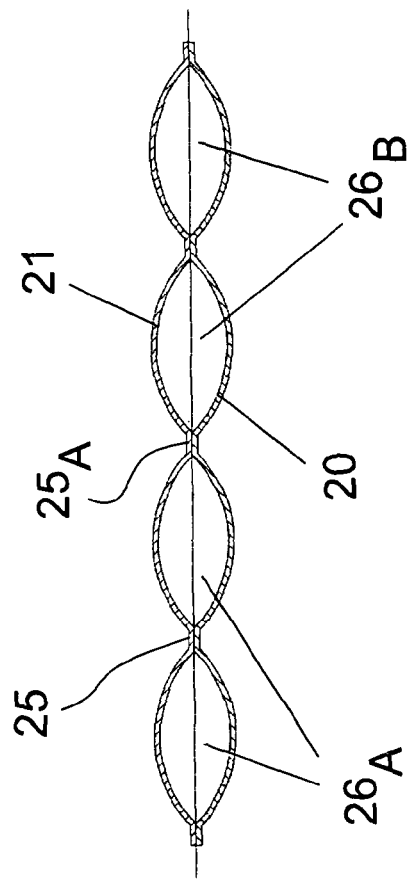
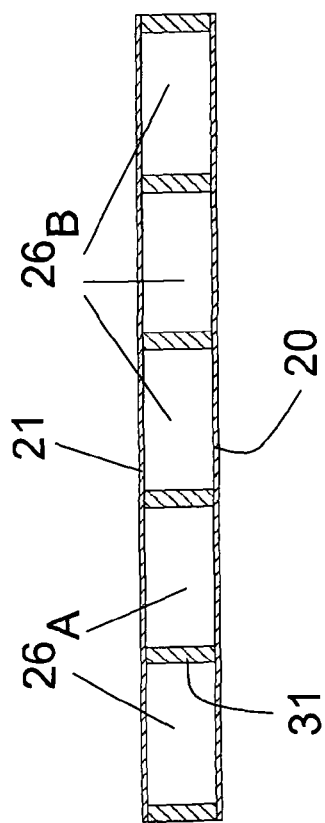

CHEMICAL REACTOR WITH A PLATE HEAT EXCHANGER

This application is a §371 national phase of PCT/EP2011/053761, filed Mar. 14, 2011, and claims priority to EP 2374532, filed Apr. 8, 2010, the entire contents of both of which are hereby incorporated by reference.

FIELD OF APPLICATION

The invention relates to isothermal chemical reactors equipped with a plate heat exchanger, and plate heat exchangers for isothermal chemical reactors.

PRIOR ART

Isothermal or pseudo-isothermal chemical reactors comprise a catalytic bed, where a chemical reaction takes place, and a heat exchanger arranged to maintain the temperature of said catalytic bed within a given range. Isothermal reactors are employed, among others, in methanol converters, where the heat exchanger removes the heat delivered by the strongly exothermic reaction of synthesis of methanol. The internal heat exchanger may be a plate heat exchanger, as disclosed for example in EP-A-1284813.

The cooling medium may be boiling water, so that the heat removed from the catalytic bed is used to produce a pressurized steam, in order to recover energy. In this description, the term steam-cooled reactor is used to refer to a chemical reactor where an exothermal reaction takes place, and the internal heat exchanger cools the catalytic bed mainly by total or at least partial evaporation of a water feed.

The vessel of the reactor comprises piping and/or connecting flanges to circulate the cooling medium through the internal heat exchanger. In a known reactor the cooling medium enters at one end and exits at the other end of the vessel: for example a cooling water flow enters at the bottom of the vessel and a steam or water/steam flow exits from top of the reactor. Hence, there is the need of a relatively large collector or distributor, respectively at the top and bottom of the exchanger, to feed or collect the medium to/from each one of the plates.

The plate isothermal reactors are becoming more and more attractive due to many advantages such as good heat exchange performance, modular design, easy maintenance, especially in the field of methanol synthesis. Then there is an incentive to continuous improvement and optimization of their design. In particular, one of the technical problems is to exploit in the best possible way the size of the vessel, i.e. the available room for the chemical reaction.

A problem of the known art is the need to deal with the different thermal expansion of the plates of the heat exchanger, relative to the vessel of the reactor. The plates and the vessel, in fact, are usually made of a different material and work at different temperature. During normal operation, the temperature of the plates is lower; during transitory steps (e.g. start-up) the plates may have a temperature both higher or lower than the vessel itself. The different thermal expansion causes a mechanical stress mainly at the inlet and outlet of the heat exchange medium, which constitute rigid points of connection between the heat exchanger and the vessel.

This problem is currently overcome by designing the internal piping in such a way to allow some displacement of the heat exchanger relative to the vessel. For example, one or more ducts for the heat exchange medium are folded in such a way to act as springs, and compensate for the relative displacement between the heat exchanger and the vessel. In a known arrangement, the heat exchange plates are radially arranged around the axis of a vertical vessel, the whole heat exchanger thus having a substantially annular form; a boiling water flow enters at the bottom of the heat exchanger and exits at the top of the same, through a large, torus-shaped collector, which is connected to each plate by means of a plurality of smaller pipes; this large connector, due to its shape, is able to flex to a certain extent, thus compensating for the thermal expansion of the heat exchanger.

The above solution however has the drawback that the internal piping is expensive and takes away room to the chemical reaction. For example the above referred torus-shaped collector takes away a relevant portion of the volume in the upper part of the vessel. Actually, the volume of the catalytic bed should be filled as much as possible with the heat exchange plates to provide accurate control of the temperature of the reaction. Another drawback is the longer installation time and a relatively difficult access for catalyst loading.

Another solution is known from EP-A-1279915, where the plates have a partition baffle to provide a U-like path of the cooling medium, and both the inlet and outlet flange can be arranged at the bottom of the reactor, leaving the upper part of the heat exchanger free from rigid connections with the vessel and, hence, free to expand.

Although this latter solution has proved to be effective, there is an incentive to provide a continuous improvement to this kind of reactor, in particular for methanol converters. The purpose of the invention is then to provide an effective and low cost configuration for a plate heat exchanger particularly in a steam-cooled chemical reactor.

SUMMARY OF THE INVENTION

The above purpose is achieved with a steam cooled chemical reactor comprising a vertical vessel containing a catalytic bed, a plate heat exchanger embedded in said catalytic bed, said heat exchanger being arranged to cool the catalytic bed by evaporation of a cooling water flow, and comprising a water inlet and a steam outlet, and a piping to distribute the water and collect the steam flow to/from evaporation channels of the plates of the heat exchanger, wherein said water inlet and steam outlet are located underneath the heat exchanger, and said piping and the heat exchange plates are arranged to provide a path for the cooling flow comprising a first ascending path from bottom to top of the catalytic bed, and a second descending path from top to the bottom of catalytic bed, said evaporation channels of the plates providing one of said first path and second path, and one or more water upcomer(s) or steam downcomer(s) providing the other of said first and second path.

In some embodiments of the invention, the cooling water passes from bottom to top of the catalytic bed through one or more upcomers, and then evaporates while flowing down through evaporation channels of the heat exchange plates. In further embodiments of the invention, the cooling water evaporates while flowing from bottom to top of the catalytic bed through the evaporation channels heat exchange plates, and the so obtained steam or steam/water flow goes back to the bottom of the bed in one or more downcomers. Preferably, said evaporation channels are straight, longitudinal channels inside the plates.

In still further embodiments, said upcomers are integrated in the plates of the heat exchanger. For example, each plate comprises one or more channels that feed an upper distributor in communication with the evaporation channels.

The invention provides the advantage that the evaporation of the cooling water takes place in a well controlled way inside the evaporation channels, allowing stable operation and good control of the temperature all over the catalytic bed. In particular, the invention further helps to avoid the formation of a possibly unstable two-phase flow inside channels designed for a liquid water flow, and any related risk of deviation from nominal condition, non-uniform distribution of temperature or local overheating of the catalytic bed. Further to this, the upper end of the plate heat exchanger is kept free from any rigid mechanical connection with the vessel of the reactor and, hence, is substantially free to move relative to the vessel. This degree of freedom compensates for the different thermal expansion and eliminates the need for expensive folded pipes, joints or the like. Another advantage of the invention is that the internal piping and related costs can be reduced. In particular, the embodiments of the invention with water upcomers integrated in the heat exchange plates allow to save the costs of water tubes and fittings.

In some embodiments of the invention, the plates of the heat exchanger are arranged with lower water inlets and upper steam outlets, and the internal piping comprises at least one downcomer arranged to take the steam-containing flow from said upper outlets to a main steam collector underneath the heat exchanger.

In further embodiments, the plates of the heat exchanger are arranged with upper water inlets and lower steam outlets, and said internal piping comprises at least one upcomer arranged to deliver the cooling water feed from a main distributor to said inlets of the heat exchange plates. A plurality of upcomers for the water feed may be provided, each of the upcomers delivering a part of the water feed to a respective group of plates of the heat exchanger. These embodiments of the invention may be preferred because the upcomers for liquid water can be much smaller than downcomers for a steam or steam/water flow, the latter having a greater specific volume.

In still further embodiments, one or more upcomer(s) are integrated in each plate of the heat exchanger. The integration of the upcomer or downcomer in the plates has the advantage to further reduce the piping and related connections. The heat exchange plates for example can be radially arranged around the vertical axis of the reactor, thus forming a heat exchanger with an overall annular structure.

According to a preferred embodiment each plate of the heat exchanger comprises:
a bottom feeder associated to the lower side of the plate; a distributor associated to the upper side of the plate and an opposite bottom collector associated to the lower side of the plate;
said bottom feeder, said distributor and said bottom collector being formed with ducts or pipe elements structurally independent from the plate;
the plate having internal passages comprising at least one evaporation channel and at least one water feed passage, said internal passages being isolated each other;
said water feed passage(s) providing a flow path between said bottom feeder and distributor, and said evaporation channel(s) providing a flow path between the distributor and said bottom collector.

The structurally independent feeder, distributor and collector are associated, for example welded, to the upper and lower sides of the plate. The structure of the plate is usually made by two metal sheets joined together to form the water feed passages and evaporation channels. More preferably, each plate of the heat exchanger comprises two opposite metal sheets, and has a plurality of longitudinal and parallel internal passages which are isolated each other by continuous spacer elements distancing the metal sheets or by continuous longitudinal seams between the metal sheets. One of said passage or a first group of said passages are arranged to direct the water feed from the bottom feeder to the upper distributor, and a second group of said passages forming the evaporation channels from the upper distributor to the bottom collector.

The feeder, the distributor and the collector are normally required to accept the flow rate of a plurality of internal passages (water feed channels or evaporation channels). Hence, the feeder, distributor and collector require a cross section which is larger than the cross section of a single internal channel of the plate; to this purpose the structurally independent construction allows to realize any of the feeder, the distributor and the collector with a greater thickness and/or a more resistant material than metal sheets of the plate, in order to have the same resistance (e.g. to internal pressure) of the plate channels.

A more preferred embodiment provides that the total cross section of the evaporation channel(s) of each plate is greater than the total cross section of the water feed passage(s) of the same plate. In some embodiments the water feed passages may have substantially the same cross section of the evaporation channels; in this case the above condition is reached with a number of evaporation channels greater than the number of water feed channels A preferred but not exclusive application of the invention is a methanol converter. In a preferred application, a methanol converter is equipped with an annular plate heat exchanger, in accordance with the above, delivering steam at a medium pressure such as 15-25 bar.

Another aspect of the invention is a novel structure of a heat exchange plate for the manufacture of a plate heat exchanger in accordance with the above. The plate comprises internal passages for a heat exchange fluid, a feeder and a collector for said fluid, and is characterized in that: said feeder and said collector are both associated to a first side of the plate; the plate comprises a fluid distributor associated to a second side opposite to said first side; said feeder, said distributor and said bottom collector are formed with ducts or pipe elements structurally independent from the plate; said internal passages of the plate comprise at least a first internal passage providing fluid communication between said feeder and said distributor, and at least a second internal passage providing fluid communication between said distributor and said collector, the second passage(s) being separate from the first passage(s).

According to some embodiments, said exchange plate comprises two opposite metal sheets, and has a plurality of longitudinal and parallel internal passages between the metal sheets, the passages being isolated each other by continuous spacer elements distancing said metal sheets or by continuous longitudinal seams. One of said passages or a first group of said passages provides communication between said feeder and said distributor, and a second group of said passages provides fluid communication between said distributor and said collector.

It should be noted that the invention is applicable regardless of the arrangement of the gaseous flow outside the plates, in the catalytic bed. The invention is then equally suitable for axial-flow or radial-flow reactors.

A further advantage of the invention is the following. Experience made by the applicant shows that in a water cooled plate heat exchanger where the cooling water has a substantially U-shaped path, i.e. the water runs at least a first ascending path from bottom to top of the catalytic bed, and a second descending path from top to the bottom of catalytic bed, it is convenient to avoid evaporation of water during the first ascending path. In other words, the cooling water should reach the top of the catalytic bed still in a liquid state. The reason is that partial evaporation causes deviation of the water flow from design conditions and then a less effective cooling of some regions of the heat exchanger, which means the risk of local overheating of the catalytic bed. If for example the water feed evaporates in the ascending path, a thin layer of liquid water may be established inside the plates, with the remaining volume of the plates filled with steam. The heat removal is then much less effective in the zone of the plate filled with superheating steam, and the outside region of the catalytic bed may overheat.

Keeping the water in a liquid state, however, is not easy because in common cases (e.g. methanol converters) the cooling water comes from a steam drum in a state close to saturation. Hence a relatively small pressure drop and/or increase in temperature of the water may cause the formation of a relevant vapour fraction.

To this purpose, it has to be noted that the pressure drop is inversely related to diameter of a duct. Moreover, a small duct has a low ratio between outside surface exposed to the hot catalytic bed, and cross section i.e. flow rate for a given velocity, which means that water flowing inside is more exposed to heat flux coming from the catalytic bed. Taking all the above into consideration, the applicant has noted that water upcomers with a small diameter are likely to cause evaporation of the water feed and to suffer the above drawbacks. The invention solves this problem, thanks in particular to the embodiments where each upcomer delivers water to a group of plates, or to the embodiments with integrated upcomers, where a plate can be formed with one or more larger channel(s) serving as water upcomer, and smaller channels to provide the descending path of the water. The larger upcomers or plate channels reduces the risk of early evaporation due to pressure drop and/or heating; it is obtained that the evaporation takes place mainly or exclusively in the descending path, as preferred.

The characteristics and advantages of the present invention will be more evident from the following description of preferred indicative and non-limiting embodiment examples, with reference to the attached figures.

BRIEF DESCRIPTION OF THE FIGURES

FIG. 3 is a cross section of the plate of FIG. 2, according to line III-III.

FIG. 4 is a cross section of a plate of a heat exchanger according to a further embodiment of the invention.

DETAILED DESCRIPTION

Figure 1:
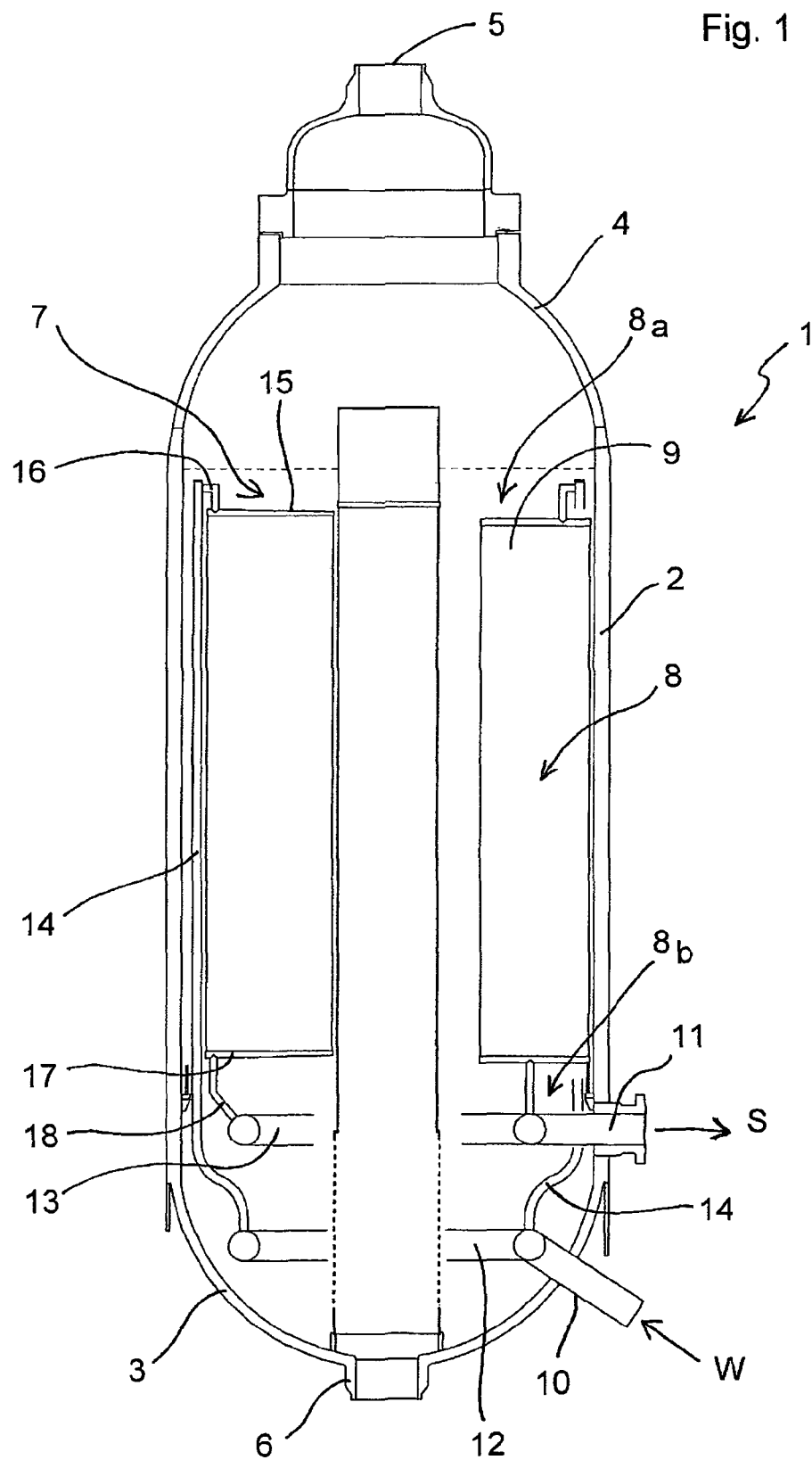
FIG. 1 is a longitudinal sectional view of an isothermal reactor, comprising an internal plate heat exchanger according to a preferred embodiment of the invention.

With reference to FIG. 1, an axial-flow reactor 1 comprises a cylindrical shell (or vessel) 2 with a vertical axis, a lower end 3 and an upper end 4, a top inlet 5 for a fresh charge of reagents and a bottom exit 6 for the products of the reaction. The reaction takes place in a catalytic bed 7 inside the vessel.

The reactor further comprises a plate heat exchanger 8 with a plurality of plates 9 arranged radially around the vertical axis of the shell 2. The heat exchanger 8 is connected to an inlet 10 for a boiling water W and an outlet 11 for a steam-containing flow S. The boiling water W can be totally or partly evaporated to form a steam or steam/water flow S.

The water W and steam S are distributed and collected to/from the plates 9 by means of a main water distributor 12 and main steam collector 13. Both the main distributor 12 and main collector 13 are located underneath the heat exchanger 8, so that the inlet 10 and the outlet 11 are located in the lower part of the reactor, i.e. in the lower end 3 or lower part of cylindrical shell 2.

Each plate 9 is internally divided into a number of passages, which are preferably straight, longitudinal and isolated from each other. The cooling water W is distributed via a plurality of upcomers 14 connected to the main distributor 12. Each plate 9 has an upper distributor 15 and each of the upcomers 14 feeds one plate 9 or preferably a subset of plates 9 via connection ducts 16 between said upcomer and said upper distributors 15. At the opposite end, each plate 9 comprises a lower collector 17; the main collector 13 receives the heat exchange medium from the lower collectors 17 of the plates 9, via connection ducts 18.

Hence, the overall path of the cooling water inside the reactor 1 comprises a first ascending path through the upcomers 14, and a second descending path through internal evaporation channels of the plates 9, down to the collector 13. The evaporation of the cooling water takes place mainly during said second descending path. The cooling water W is evaporated in full or in part, removing heat from the catalytic bed 7.

It may be appreciated from FIG. 1 that the upper end 8a of the heat exchanger 8 is substantially free relative to the vessel 2, all the pipes connecting the heat exchanger to the vessel, such as the main ducts 12 and 13 and related piping, being located in the lower part 8b.

In a substantially dual arrangement (not shown), the water W evaporates while flowing upwards inside internal evaporation channels of the plates 9, and then returns down to a main collector, via a plurality of downcomers.

In further embodiments of the invention, the upcomers 14 are substantially integrated in the plates of the exchanger 8, i.e. each plate has at least one internal passage which is used to convey a respective portion of the water feed W to the respective upper distributor 15.

Figure 2:
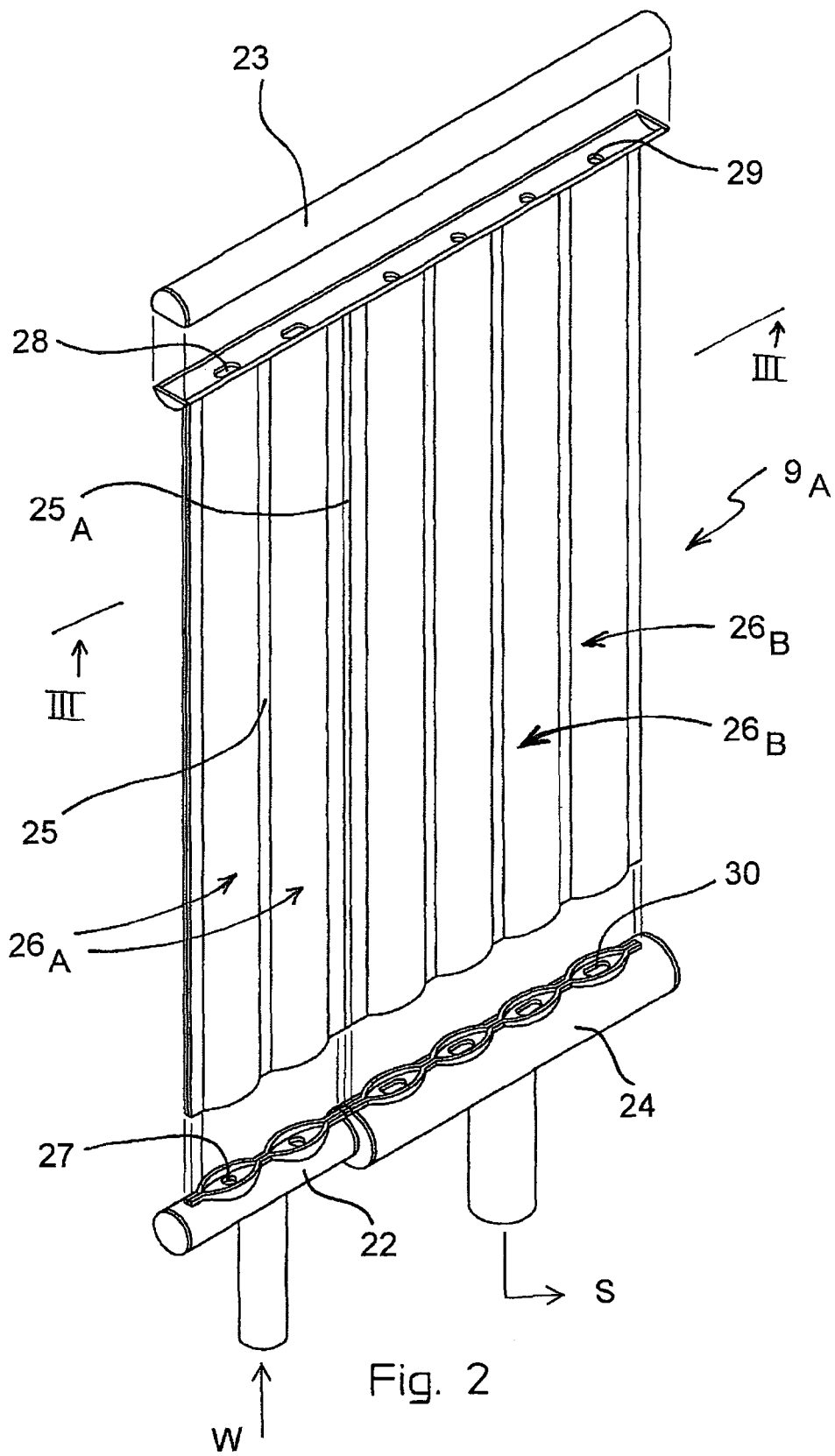
FIG. 2 is a view of a plate of a heat exchanger according to another embodiment of the invention.

An example of a plate 9A with integrated upcomers is shown in FIGS. 2 and 3. The plate has basically a rectangular shape with opposite long sides and short sides, comprising two opposite metal sheets 20, 21, a feeder 22 associated to a first side of the plate, such as the lower short side in an arrangement equivalent to that of FIG. 1, a distributor 23 associated to a side of the plate opposite to said first side, and a collector 24 associated to said first side.

The plate 9A has a plurality of internal passages between the metal sheets 20 and 21, said passages being isolated each other by continuous longitudinal seams 25 and 25A between said metal sheets. In the example, two passages 26A are in communication between the feeder 22 and the distributor 23, via apertures 27 and 28 respectively, and further passages (or channels) 26B are in communication between the distributor 23 and collector 24, via apertures 29, 30.

Hence, a water inlet flow W (FIG. 2) follows a first path through the passages 26A in one sense, and a second path through the passages 26B, in the opposite sense. For example the plate 9A is arranged inside a vertical reactor so that the side of feeder 22 and collector 24 is the lower side. Hence, the passages 26A operates as upcomers for the water flow, and the passages 26B operates as evaporation channels for the descending flow, producing the steam/water flow S.

Preferably the cross section of water feed passages 26A is greater than the cross section of evaporation passages 26B. For example, a number $N_A$ of passages 26A delivers water to a number $N_B$ of passages 26B, $N_B$ being greater than $N_A$. FIG.

2 shows an embodiment where two larger passages 26A feed four smaller channels 26B. Preferably the total cross section of water feed passages 26A is substantially equal to the sum of cross sections of the evaporation channels 26B. The larger cross section of water feed passages 26A helps to maintain the water feed W in a liquid state while flowing until the top of the catalytic bed, for the reasons explained above.

FIG. 4 shows another embodiment of the invention where the passages 26A, 26B between the metal sheets 20 and 21 are defined by spacers 31. Preferably the spacers 31 have a solid cross section which allows the plate withstanding a relevant pressure difference.

The invention claimed is:

1. A steam cooled chemical reactor comprising:
a vertical vessel containing a catalytic bed, and
a plate heat exchanger comprising a plurality of plated having internal passages or channels embedded in said catalytic bed,
said heat exchanger being arranged to cool the catalytic bed by evaporation of a cooling water flow, and comprising a water inlet and a steam outlet, and a piping to distribute the water and collect the steam flow to/from the internal passages or channels of the plates of the heat exchanger,
wherein said water inlet and steam outlet are located underneath the heat exchanger, and said piping and the heat exchange plates are arranged to provide a path for the cooling flow comprising a first ascending path from bottom to top of the catalytic bed, and a second descending path from top to the bottom of catalytic bed, a plurality of evaporation channels providing said second descending path, and one or more water upcomer(s) providing said first ascending path,
wherein the total cross section of the evaporation channels of each plate is greater than the total cross section of the one or more water upcomer(s) of the same plate, and
wherein the number of evaporation channels of each plate is greater than the number of the water upcomer(s) of the same plate.

2. The reactor according to claim 1, wherein the plates of the heat exchanger are arranged with upper water inlets and lower steam outlets, and said internal piping comprises at least one upcomer arranged to deliver the cooling water feed from a main distributor to said inlets of the heat exchange plates.

3. The reactor according to claim 2, comprising a plurality of upcomers for the water feed, each of said upcomers delivering water to a group of plates of the heat exchanger.

4. The reactor according to claim 2, wherein at least one upcomer for the water feed is integrated in each plate of the heat exchanger.

5. The reactor according to claim 4, wherein each plate of the plate heat exchanger comprises:
a bottom feeder associated to the lower side of the plate; a distributor associated to the upper side of the plate and an opposite bottom collector associated to the lower side of the plate;
said bottom feeder, said distributor and said bottom collector being formed with ducts or pipe elements structurally independent from the plate;
the plate having internal passages comprising a plurality of evaporation channels and at least one water feed passage, said internal passages being isolated from each other;
said water feed passage(s) providing a flow path between said bottom feeder and distributor, and said evaporation channels providing a flow path between the distributor and said bottom collector.

6. The reactor according to claim 5, wherein each plate of the heat exchanger comprising two opposite metal sheets, said internal passages being longitudinal and parallel, said passages being isolated from each other by continuous spacer elements distancing the metal sheets or by continuous longitudinal seams between the metal sheets.

7. The reactor according to claim 1, wherein the heat exchange plates are radially arranged around the vertical axis of the reactor.

8. The reactor according to claim 1, wherein the reactor is a methanol converter.

9. A heat exchange plate for the manufacture of a plate heat exchanger for an isothermal chemical reactor, the plate comprising internal passages for a heat exchange fluid, a feeder and a collector for said fluid, wherein:
said feeder and said collector are both associated to a first side of the plate; the plate comprises a fluid distributor associated to a second side opposite to said first side;
said feeder, said distributor and said collector are formed with ducts or pipe elements structurally independent from the plate;
said internal passages of the plate comprise at least a first internal passage providing fluid communication between said feeder and said distributor, and a plurality of second internal passages providing fluid communication between said distributor and said collector, the second passages being separate from the first passage(s), wherein the total cross section of said second passages are greater than the total cross section of said first passage(s) and the number of said second passages are greater than the number of said first passage(s).

10. The heat exchange plate according to claim 9, comprising two opposite metal sheets, and having a plurality of longitudinal and parallel internal passages between the metal sheets, the passages being isolated from each other by continuous spacer elements distancing said metal sheets or by continuous longitudinal seams.

11. The heat exchange plate according to claim 10, wherein the first passage or each of the first passages has a cross section larger than the cross section of each of the second passages, taken alone.

\* \* \* \* \*